(12) United States Patent
Kamioka

(10) Patent No.: US 6,655,510 B2
(45) Date of Patent: Dec. 2, 2003

(54) HYDRAULIC DAMPER

(75) Inventor: Takamasa Kamioka, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 09/953,438

(22) Filed: Sep. 17, 2001

(65) Prior Publication Data

US 2002/0033309 A1 Mar. 21, 2002

(30) Foreign Application Priority Data

Sep. 19, 2000  (JP) ........................................ 2000-282830

(51) Int. Cl.[7] .............................. F16F 9/46; B62K 25/08
(52) U.S. Cl. .................................... 188/266.5; 188/297
(58) Field of Search .............................. 188/280, 297, 188/322.13, 318, 319.2, 266.1–266.6, 299.1, 285, 322.14, 322.19, 282.5, 282.6, 282.1, 313, 319.1, 281; 280/275, 283, 284, 276, 288, 286; 267/64.15, 64.26

(56) References Cited

U.S. PATENT DOCUMENTS

| | | | | |
|---|---|---|---|---|
| 1,028,400 A | * | 6/1912 | Stanton | |
| 3,810,659 A | * | 5/1974 | Marcil | |
| 5,078,241 A | * | 1/1992 | Ackermann et al. | |
| 5,275,264 A | * | 1/1994 | Isella | |
| 5,341,905 A | * | 8/1994 | Lu | 188/320 |
| 5,478,099 A | * | 12/1995 | Kawahara | 280/276 |
| 5,522,483 A | * | 6/1996 | Koch | |
| 5,538,115 A | * | 7/1996 | Koch | |
| 5,634,653 A | * | 6/1997 | Browning | 280/276 |
| 6,105,987 A | * | 8/2000 | Turner | |
| 6,360,857 B1 | * | 3/2002 | Fox et al. | 188/319.1 |
| 6,360,858 B2 | * | 3/2002 | Gonzalez et al. | |
| 2001/0400781 | * | 11/2001 | Gonzalez et al. | |

FOREIGN PATENT DOCUMENTS

| | | |
|---|---|---|
| DE | 84 37 034.3 | 11/1988 |
| DE | 41 03 356 C1 | 6/1992 |
| GB | 556903 | 10/1943 |
| GB | 2095361 | 9/1982 |

\* cited by examiner

Primary Examiner—Douglas C. Butler
(74) Attorney, Agent, or Firm—Rabin & Berdo, P.C.

(57) ABSTRACT

An inner tube (2) connected to a vehicle body is inserted such that it is free to extend and contract in an outer tube (1) joined to a vehicle shaft. A partitioning member (3) divides an internal oil chamber at the end of the inner tube. A damping valve (4) and a bypass passage (3d) parallel to this damping valve (4) are disposed in this partitioning member (3). A control rod (5) opens and closes the bypass passage (3d). An actuator (20) in the inner tube (2) controls the control rod (5). By operating the control rod (5) via the actuator (20) to open/close the bypass passage (3d), the damping force generated is varied.

9 Claims, 2 Drawing Sheets

HYDRAULIC DAMPER

FIELD OF THE INVENTION

The present invention relates to a hydraulic damper, and in particular to a hydraulic damper which is highly suited to a rear cushion unit or a front fork mounted in a two-wheeled vehicle such as a bicycle or a motorbike.

Field of the Invention

In recent years, bicycles, and in particular bicycles which perform off-load running, are being provided with a hydraulic damper as a front fork or a rear cushion unit. Some of these hydraulic dampers can vary the damping force according to a running condition.

However, hydraulic dampers which enable variations of the damping force have a complex construction, have large numbers of parts and demand a large number of assembly steps, thereby leading to increased manufacturing costs and increased weight. Thus, their application particularly to bicycles was difficult.

SUMMARY OF THE INVENTION

It is therefore an object of this invention to provide a hydraulic damper which is highly suitable for a front fork or a rear cushion unit of a bicycle, and which permits a damping force to be variably adjusted.

It is a further object of this invention to provide a hydraulic damper which is of simple construction, lightweight and easily fitted to a bicycle.

In order to achieve the above objects the present invention provides a hydraulic damper which comprises an inner tube and an outer tube, one of which is connected to a vehicle body and the other of which is connected to a vehicle shaft. The hydraulic damper comprises a partitioning member provided at the end of the inner tube which divides an internal oil chamber, a damping valve disposed in this partitioning member, a bypass passage disposed in parallel with the damping valve, a control rod which opens and closes the bypass passage, and an actuator installed in the inner tube which controls the control rod, wherein the damping force generated is varied by operating the control rod via the actuator so as to open and close the bypass passage.

The details as well as other features and advantages of the invention are set forth in the remainder of the specification and are shown in the accompanying drawings.

DESCRIPTION OF THE PREFERRED EMBODIMENTS

Figure 1:
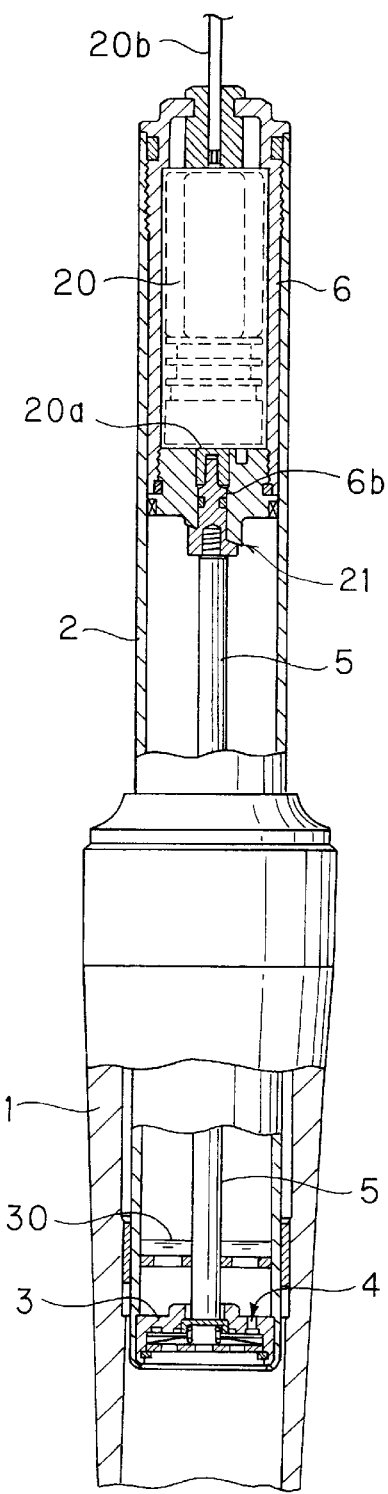
FIG. 1 is a front view showing a partial cross section of the upper side of a front fork according to one embodiment of this invention.

This invention will now be described based on the embodiment shown in the drawings.

In this embodiment, the oil damper according to this invention is applied to the front fork of a bicycle. The front fork supports the front wheels, a pair of front forks normally being provided for the front wheels on either side of the vehicle shaft. According to this embodiment, the pair of front forks elongate and contract in synchronism according to the load of the vehicle body, but they do not have an identical construction, one front fork comprising a suspension spring and the other front fork only generating a damping force.

The front fork shown in FIG. 1 generates a damping force, and therefore does not comprise a suspension spring.

The front fork comprises an outer tube 1, and an inner tube 2 inserted free to slide in the outer tube 1. The lower end of the outer tube 1 is joined to the vehicle shaft, not shown, and the upper end of the inner tube 2 is joined to the vehicle body, not shown.

A valve disk 3 which functions as a partitioning member is fixed to the lower end of the inner tube 2, i.e., the end which is inserted into the outer tube 1, and an internal oil chamber is divided vertically by this valve disk 3. This valve disk 3 comprises a damping valve 4 and a bypass passage 3*d* which bypasses the damping valve 4.

Figure 2:
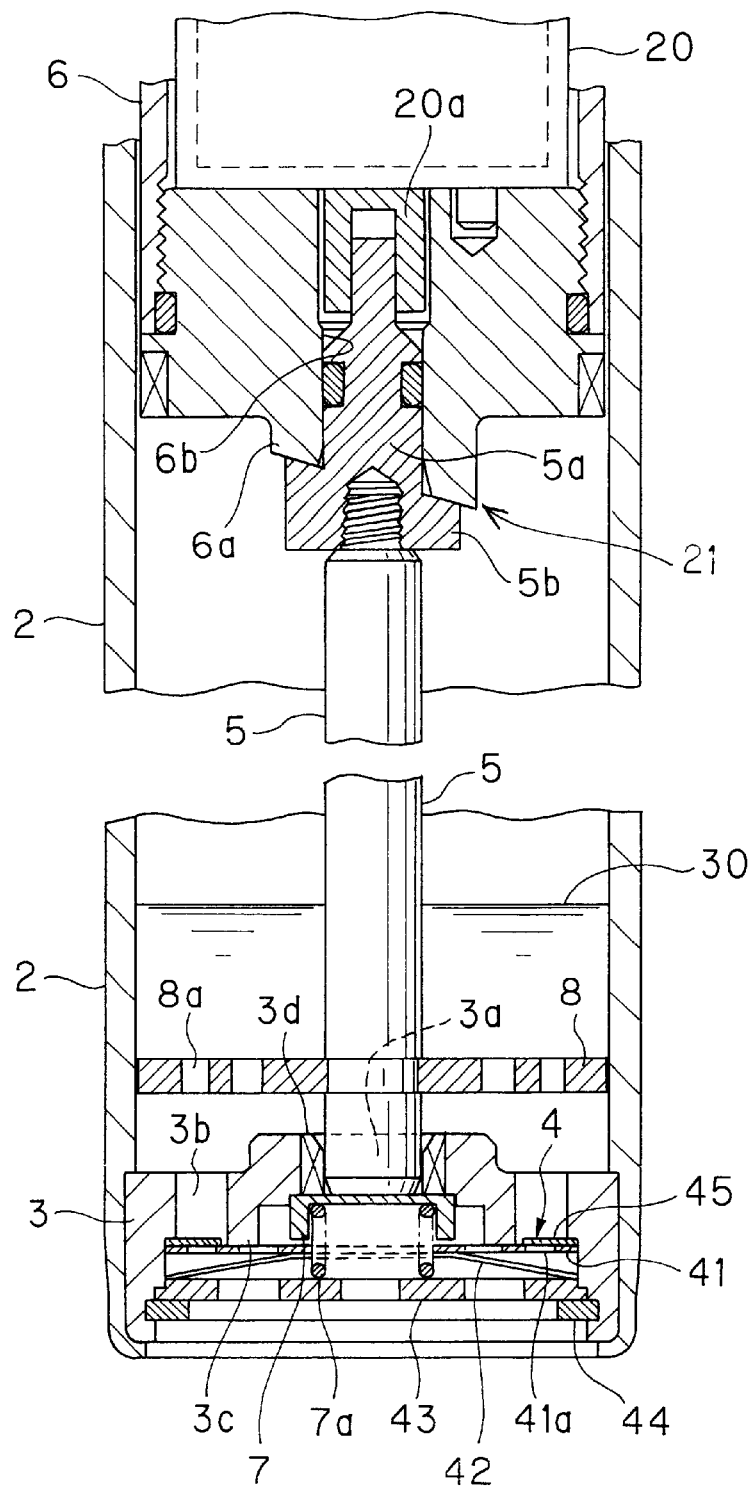
FIG. 2 is a partial cross section showing an enlargement of the essential parts of the front fork of FIG. 1.

The detailed construction of the valve disk 3 is shown in FIG. 2.

The valve disk 3 is fixed inside the lower end of the inner tube 2 by clamping. An oil surface 30 is provided above the valve disk 3, and when the inner tube 2 performs its maximum stroke in the elongation direction relative to the outer tube 1, i.e., even at maximum elongation, the oil in the oil chamber inside the front fork is sealed so that the oil surface 30 lies above the valve disk 3.

The valve disk 3 comprises a port 3*b* traversing it in a vertical direction. A leaf valve 41 of the damping valve 4, which seals the port 3*b* so that it may be opened or closed, is also provided on the lower surface of the valve disk 3. This leaf valve 41 is pressed against a valve seat 3*c* on the lower surface of the valve disk 3 by the pressing force of a plate spring 42 disposed on the lower surface.

The lower end of the plate spring 42 is supported by a supporting member 43 perforated by holes which permit passage of oil, this supporting member 43 being supported by a stop ring 44 which is fitted to the inner circumference at the lower end of the valve disk 3.

An annular leaf valve 45, also of the damping valve 4, lies on the upper surface of the outer circumference of the leaf valve 41. When the leaf valve 41 is pressed against the valve disk 3 by the pressing force of the plate spring 42, this annular leaf valve 45 is supported between the leaf valve 41 and the valve disk 3, i.e., so that its outer circumference end is fixed and its inner circumference end is free.

In the stationary state shown in the drawing, i.e., when this annular leaf valve 45 lies over the leaf valve 41, it seals a throughhole 41*a* formed in the leaf valve 41 at a position opposite the port 3*b*.

In the damping valve 4, when the upper side of the valve disk 3 is at high pressure, i.e., when the front fork is elongating so that the inner tube 2 is projecting from the outer tube 1, the leaf valve 41 separates from the valve seat 3*c* with the annular leaf valve 45 lying over it against the spring force of the plate spring 42, and moves downwards. Due to this downward motion of the leaf valve 41, an annular gap is formed with the valve seat 3*c* which permits oil to flow towards the lower end of the valve disk 3 via the port 3*b*.

The spring force of the plate spring 42 is set very low, and during elongation stroke, as the leaf valve 41 simply descends under oil pressure, it functions to prevent insufficiency of oil aspirated towards the lower side of the valve disk 3. However, if the spring force of the plate spring 42 is set high, the leaf valve 41 obviously generates a high damping force during elongation.

Conversely, when the lower side of the valve disk 3 is at high pressure, i.e., when the front fork is contracting and the inner tube 2 is moving into the outer tube 1, as shown in the drawing, the leaf valve 41 of the damping valve 4 is pressed against the valve disk 3 by oil pressure acting on the rear surface, which is on the lower side and the spring force of the plate spring 42 so as to seal the port 3b.

However, the pressure of the oil on the rear surface of the leaf valve 41 acts on the annular leaf valve 45 via a throughhole 41a formed in the leaf valve 41. Consequently, oil flows towards the port 3b while the inner circumferential end of the annular leaf valve 45 is turned upwards, and a predetermined compressive damping force is thereby generated.

Thus, in the damping valve 4, by laying the annular leaf valve 45 over the leaf valve 41 which functions as an intake valve, a compressive damping force is generated, so the number of parts can be reduced and the construction can be simplified.

The valve disk 3 comprising the damping valve 4, comprises the bypass passage 3d which bypasses the damping valve 4 as described above. According to this invention, the damping force generated during elongation and contraction stroke can be varied by opening and closing this bypass passage 3d.

The bypass passage 3d comprises a vertical groove 3d formed on the inner circumferential side face of a throughhole 3a passing through the center of the valve disk 3. An open/close valve 7 is disposed on the lower surface of the valve disk 3 so as to open or close communication with the vertical groove 3d, and a push rod 5 which controls this open/close valve 7 is provided coaxially with the inner tube 2. The open/close valve 7 is pushed in the closing direction by a spring 7a, the lower end of the spring 7a being supported by the supporting member 43 described above.

The lower end of the push rod 5 is inserted into the throughhole 3a, and when the push rod 5 moves downwards, the open/close valve 7 is pushed down against the spring 7a so as to open the lower surface of the vertical groove 3d. Thus, oil can flow through the vertical groove 3d in the vertical direction of the valve disk 3, and the damping force relatively decreases. It is also possible to open the leaf valve 41 via open/close valve 7 when the push rod 5 moves downwards to decrease the damping force.

On the other hand, when the push rod 5 moves upwards, the open/close valve 7 closes the lower surface of the vertical groove 3d, the flow of oil is blocked, and the damping force relatively increases.

The upper end of the push rod 5 is joined coaxially with a connecting axial member 5a disposed above the inner tube 2. This connecting axial member 5a is supported free to rotate in an axial hole 6b passing through the center of a holder 6 comprising a cap which is fixed to the upper end of the inner tube 2.

A rotary actuator 20 is installed above the connecting axial member 5a, the connecting axial member 5a being joined to a drive shaft 20a of this actuator 20. When the actuator 20 is rotation driven, the push rod 5 also rotates in synchronism.

The upper end of the connecting axial member 5 is engaged slidable in the axial direction with the drive shaft 20a of the actuator 20 like a spline engaging. Thus, the connecting axial member 5a is also free to perform a relative displacement in the axial direction while rotating in synchronism with the drive shaft 20a.

A cylindrical member 6a projects from the circumference of the axial hole 6b on the lower surface of the holder 6, an inclined surface being formed on the end surface of this cylindrical member 6a. A flange 5b is formed on the connecting axial member 5a and an inclined surface corresponding to the aforesaid inclined surface is also formed on this flange 5b so as to form a cam mechanism 21.

Due to this cam mechanism 21, when the connecting axial member 5a is rotated via the actuator 20, the connecting axial member 5a also displaces in an axial direction relative to the cylindrical member 6a of the holder 6, and the push rod 5 is pushed down.

When a rider operates the control switch or control lever, not shown, an electrical signal is input to the actuator 20 and the drive shaft 20a is rotated in one direction. When the electrical signal is stopped, the drive shaft 20a is rotated in the opposite direction. When the actuator 20 is operated in the reverse direction, the push rod 5 is pushed back to the initial position by the spring 7a at its lower end.

This actuator 20 may also be operated automatically by inputting an electrical signal based on the running speed of the vehicle, speed change gear ratio etc.

The actuator 20 is not necessarily a rotor type, and may be a type wherein the drive shaft 20a displaces in an axial direction. In this case, the push rod 5 is pushed down directly, so the cam mechanism 21 is unnecessary.

A harness 20b which permits input of the electrical signal extends further outside than the upper end of the inner tube 2 from the upper end of the actuator 20, as shown also in FIG. 1.

In FIG. 2, the push rod 5 comprises a rectifying plate 8 in a part below the oil surface in a position near the valve disk 3. Plural holes 8a are formed in this rectifying plate 8, and the flow of oil which moves according to the extension and contraction stroke of the inner tube 2 relative to the outer tube 1, is rectified by passing through this rectifying plate 8. As a result, air above the oil surface in the front fork is prevented from mixing as bubbles in the oil, and fluctuation of damping characteristics is prevented.

When the front fork is manufactured and the push rod 5 is assembled in the inner tube 2, the push rod 5 is inserted while using this rectifying plate 8 as a jig, i.e., while bringing the outer circumference of the rectifying plate 8 in sliding contact with the inner circumference of the inner tube 2, so the lower end can be firmly inserted in the throughhole 3a in the center of the valve disk 3, and ease of assembly is enhanced.

In this way, according to this invention, the vertical groove 3d which is the aforesaid bypass passage can be opened and closed as desired. When the bypass passage is closed, a damping force on the high pressure side is generated by the damping valve 4, as described above.

When the bypass passage is released, the damping force can be reduced regardless of the damping valve 4.

Therefore, for example during an acceleration of the bicycle, when the bypass passage is closed, a relatively high damping force is generated which suppress body action of the bicycle to enable of improving acceleration and the bicycle is running on an ordinary flat road, the bypass passage can be opened to reduce the damping force and make the riding experience more comfortable.

The construction of the bypass passage is not limited to the above. Instead, for example, a vertical groove may be formed at a position on the outer circumference of the lower end of the push rod 5 wherein it is inserted in the throughhole 3a. When the push rod 5 displaces upwards and the upper part of the vertical groove projects above the throughhole 3a, both of the oil chambers, which are the upper part and the lower part of the valve disk 3 respectively, communicate due to the vertical groove, and a flow of oil is permitted.

Therefore, when the push rod 5 is pulled upwards, the damping force becomes relatively small, whereas when the push rod 5 is pushed downwards, the vertical groove enters the interior of said throughhole 3a, the flow of oil is shut off, and the damping force is relatively increased.

By pushing the lower end of the push rod 5 upwards by a return spring, the push rod 5 may be pushed back corresponding to the motion of the actuator 20.

According to another construction, the vertical groove 3d can be omitted, and a sloping port branching off from the port 3b may be made to communicate with the interior of the throughhole 3a. In this construction, when the push rod 5 displaces upwards, the sloping port communicates with the throughhole 3a, and the bypass passage is released.

In the above embodiment, the case was described where the hydraulic damper according to this invention was a front fork in a two-wheeled vehicle such as a bicycle. According to the purpose of the invention, the hydraulic damper according to this invention may also be a rear cushion unit in a bicycle, and in this case the effect is identical to that described above. Further, it may also be applied to the front fork or rear cushion unit of a motorbike.

What is claimed is:

1. A hydraulic damper comprising an inner tube and an outer tube, one of which is connected to a vehicle body and the other of which is connected to a vehicle shaft, comprising:

a partitioning member provided at the end of the inner tube which divides an internal oil chamber, a damping valve disposed in this partitioning member, and a bypass passage disposed in parallel with the damping valve, wherein the bypass passage is formed in the center of the partitioning member, the damping valve is formed around the bypass passage, the damping valve is an annular leaf valve, the control rod connected to the actuator is disposed coaxially with the inner tube, the end of the control rod is inserted in the bypass passage, and the bypass passage is opened and closed by moving the control rod in the axial direction, a control rod which opens and closes the bypass passage, a rectifying plate provided on the control rod, wherein the outer circumference of the rectifying plate is made to slide in contact with the inner circumference of the inner tube, and the flow of oil is rectified by the rectifying plate, an actuator installed in the inner tube which controls the control rod, wherein the damping force generated is varied by operating the control rod via the actuator so as to open and close the bypass passage.

2. A hydraulic damper as defined in claim 1, wherein:

an open/close valve which closes the bypass passage is provided, and the open/close valve is opened and closed by moving the control rod in the axial direction.

3. A hydraulic damper as defined in claim 1, further comprising:

a cam mechanism which converts the rotation of a drive shaft of the actuator to an axial motion, and transmits it to the control rod.

4. A hydraulic damper having an inner tube and an outer tube, one of which is for connection to a vehicle body and the other of which is for connection to a vehicle shaft, the hydraulic damper comprising:

a partitioning member dividing an internal oil chamber at an end of the inner tube, a bypass passage disposed in a center of the partitioning member, an annular leaf valve, disposed in the partitioning member in parallel with and surrounding the bypass passage, a control rod coaxial with the inner tube, the control rod having an end disposed in the bypass passage, an actuator in the inner tube, connected to and controlling the control rod to move axially of the inner tube to open and close the bypass passage, so as to vary a generated damping force, and a rectifying plate disposed on the control rod, the rectifying plate having an outer circumference in slidable contact with an inner circumference of the inner tube, the rectifying plate rectifying a flow of hydraulic fluid in the internal oil chamber.

5. A hydraulic damper as defined in claim 4, wherein the rectifying plate is axially spaced from the partitioning member.

6. A hydraulic damper as defined in claim 5, wherein the rectifying plate is mounted on the control rod so as be positioned between the partitioning member and an upper surface of the hydraulic fluid.

7. A hydraulic damper as defined in claim 4, wherein the rectifying plate has a plurality of openings surrounding the control rod.

8. A hydraulic damper as defined in claim 4, further comprising an open/close valve for closing the bypass passage, movement of the control rod in the axial direction opening and closing the open/close valve.

9. A hydraulic damper as defined in claim 4, further comprising a cam mechanism, the cam mechanism converting rotation of a drive shaft of the actuator to an axial motion, and transmitting the axial motion to the control rod.

* * * * *